(12) United States Patent
Neves

(10) Patent No.: US 9,957,139 B2
(45) Date of Patent: May 1, 2018

(54) OVERLOAD BRAKE FOR TROLLEY

(71) Applicant: Flexcrane, Inc., Burleson, TX (US)

(72) Inventor: Vitor Neves, Maia (PT)

( * ) Notice: Subject to any disclaimer, the term of this patent is extended or adjusted under 35 U.S.C. 154(b) by 0 days. days.

(21) Appl. No.: 15/498,333

(22) Filed: Apr. 26, 2017

(65) Prior Publication Data

US 2017/0305725 A1 Oct. 26, 2017

Related U.S. Application Data

(60) Provisional application No. 62/327,940, filed on Apr. 26, 2016.

(51) Int. Cl.
| | |
|---|---|
| *B66C 15/00* | (2006.01) |
| *F16D 55/02* | (2006.01) |
| *B66C 6/00* | (2006.01) |
| *B66C 11/14* | (2006.01) |
| *F16D 63/00* | (2006.01) |
| *F16D 127/00* | (2012.01) |

(52) U.S. Cl.
CPC ............. *B66C 15/00* (2013.01); *B66C 6/00* (2013.01); *B66C 11/14* (2013.01); *F16D 55/025* (2013.01); *F16D 63/00* (2013.01); *F16D 2127/005* (2013.01)

(58) Field of Classification Search
CPC ........... B66C 6/00; B66C 11/14; B66C 15/00; B66C 15/06; B66C 16/00; F16D 63/00; F16D 65/18; F16D 65/28; F16D 2127/005

USPC .............................. 104/95; 105/154; 188/195
See application file for complete search history.

(56) References Cited

U.S. PATENT DOCUMENTS

| | | | | |
|---|---|---|---|---|
| 4,462,570 A | * | 7/1984 | Gagnet | B66D 1/58 |
| | | | | 254/268 |
| 4,531,460 A | * | 7/1985 | Pamer | B61B 13/04 |
| | | | | 104/107 |
| 5,524,548 A | * | 6/1996 | Fox | B61H 7/00 |
| | | | | 104/249 |
| 8,453,802 B1 | * | 6/2013 | Simpson | B60T 1/14 |
| | | | | 105/148 |
| 2013/0112645 A1 | * | 5/2013 | Laliberte | B61H 5/00 |
| | | | | 212/312 |
| 2016/0052400 A1 | * | 2/2016 | McGowan | B60L 7/28 |
| | | | | 104/93 |
| 2016/0340160 A1 | * | 11/2016 | Neves | B66D 3/006 |
| 2017/0305725 A1 | * | 10/2017 | Neves | B66C 15/00 |

* cited by examiner

*Primary Examiner* — Zachary L Kuhfuss

(57) ABSTRACT

An overload brake and method for trolley suspended on a flange of a load traveling apparatus girder prevents the displacement movement of a suspended load along a girder by clamping a brake between two symmetrical flange tabs of the girder. The girder is elastically deformed by the load which is applied to the girder by the contact between a surface of the girder and translation wheels that move the load along the girder. Upon sufficient elastic deformation, portions of the girder contact a brake to prevent movement of the load along the girder.

10 Claims, 3 Drawing Sheets

OVERLOAD BRAKE FOR TROLLEY

BACKGROUND

This disclosure relates to an overload brake for trolley designed to prevent the displacement of suspended trolleys along girders when suspending loads over the maximum capacity range.

Trolleys are typically components of overhead cranes such as bridge and gantry cranes, monorails, tracks, conveyor systems, load column lifters, crane runways, fixed or mobile, whether in linear form straight or curved shaped.

Lifting and handling equipment are typically named bridge cranes, overhead traveling cranes, gantry cranes, runways, monorails or tracks and usually include, in addition support structures and horizontal traveling mechanisms, lifting mechanisms usually called chain, wire rope, manual or electric driven hoists intended for load lifting.

For safe handling, some hoists include mechanical or electrical devices able to prevent overload lifting operations. Whereas if the load limit detection security mechanism is not available, or inoperable, nothing prevents the operator from lifting and displacing a load weighing more than the lifting and handling apparatus design load limit and in this case, the operator becomes responsible to ensure the payload does not exceed the maximum allowable load for the lifting and moving device.

The load limit detection devices are typically mounted directly on the component that suspends the load or indirectly via torque detection through clutches for torque arms. The load limit detection device blocks the lifting operation when overloads are detected.

There are also mechanical devices that limit the translation of the suspended load independent of the load lifting limitation devices. These devices require additional mechanisms of elastic deformation exclusively dedicated load detection and acting on the locking elements or locking of the translatory movement of the cars that support the loads figures.

SUMMARY

In accordance with the disclosure, an improved overload brake for trolley is provided.

The subject matter of the present technology is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

DETAILED DESCRIPTION

Figure 1:
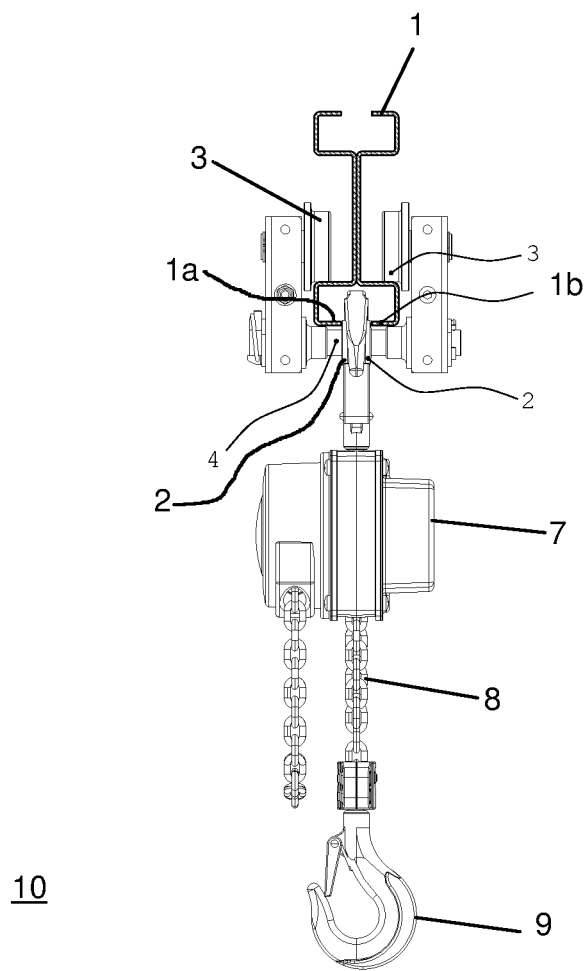
FIG. 1 is a view of a lifting and handling apparatus girder section and trolley mechanism suspended on wheels.

The system according to a preferred embodiment of the present disclosure comprises the overload brake for trolley mounted on a trolley 4 that is suspended from a lifting and handling apparatus girder 1, as shown in FIG. 1. The system prevents the displacement movement of a suspended load as soon as this value exceeds the allowable value of girder 1 within its elastic deformation capacity range.

The overload brake 10 comprises a pair of wheels 3 that are mounted to ride along a surface of girder 1 to allow translation of the device and the load carried below along the length of the girder. Hoist 7 is attached to the braking device and raises and lowers, by extension and retraction of load chain 8, hook 9 carried on an end of the chain, for attaching to a load.

A brake having a pair of brake disks 2 is positioned to be mounted between the opening formed by two symmetrical loaded flange tabs 1a, 1b of the girder 1 web, the flange tabs forming a concave C section, with the opening facing the direction of the load and symmetrical along the girder 1 web axis.

Figure 2:
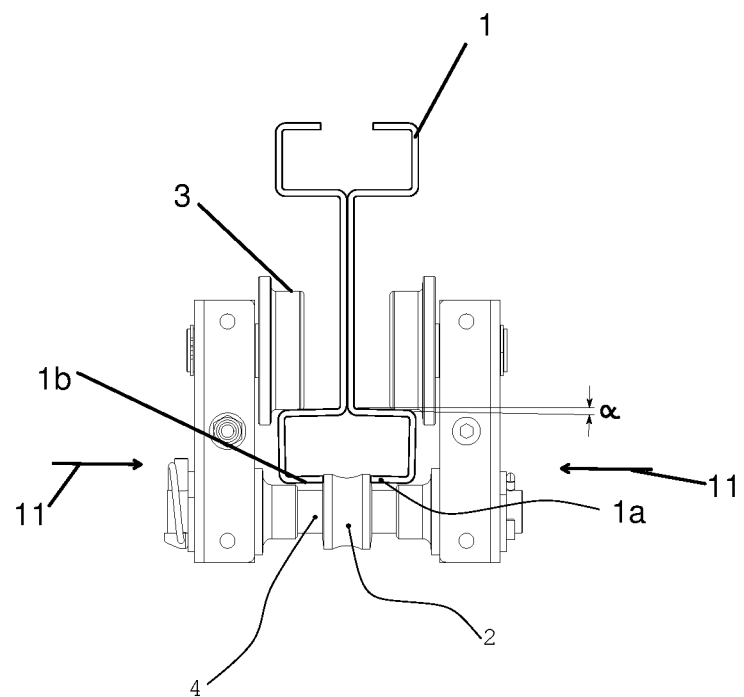
FIG. 2 is a drawing of the girder section with trolley showing the girder lower flange elastically deformed by the action of vertical load applied by the wheels and clamping the brake mounted on the trolley.
Figure 3:
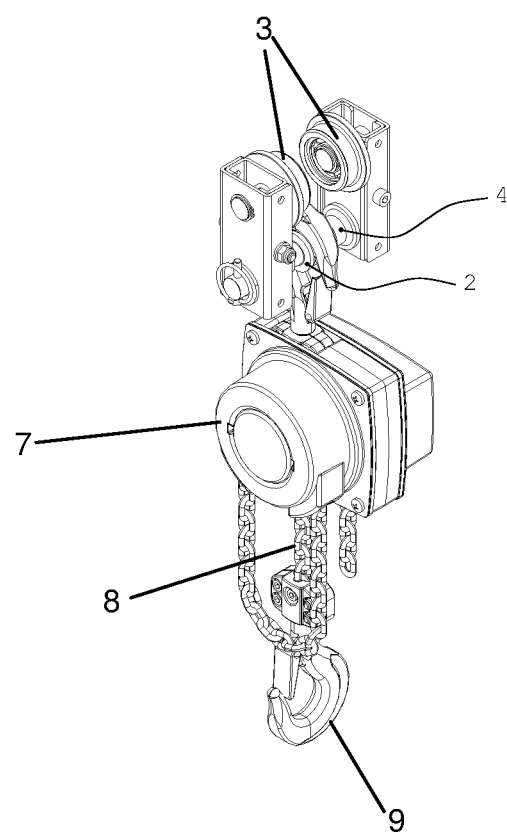
FIG. 3 is a perspective drawing of the trolley and brake in absence of a girder.

As shown in FIG. 2, a view of the girder section with trolley with the hoist, load chain and hook removed for illustration, if overload lifting is attempted, the girder lower flanges 1a and 1b elastically deform by the action of vertical load applied by the circular surfaces of wheels 3 riding on the girder wheel engaged surface of the girder, which causes a local $\alpha$ angular elastic deformation the girder (1) loaded flange. This angular deformation moves the tabs 1a and 1b inwardly in the direction of arrows 11, causing girder flange tabs 1a and 1b to contact to brake disks 2 and to clamp the brake mounted on the trolley by the elastic deformation of the girder 1 loaded flange.

Such local $\alpha$ elastic angular elastic deformation is used to block the displacement movement of the trolley 4 along girder 1 by compressing the brake between the two symmetrical tabs of the girder 1 loaded flange.

In accordance with the disclosure, an improved overload brake is provided which can prevent displacement of a suspended trolley along a girder when an attempt to lift an overcapacity load is made.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. An overload brake for trolley, characterized by using local $\alpha$ angular elastic deformation of the girder loaded flange to block the trolley displacement movement along the girder by compressing a brake between two symmetrical tabs of the girder loaded flange.

2. An overload brake for trolley according to claim 1, wherein the brake is mounted between two symmetrical loaded flange tabs that form a concave C section, with the opening facing the direction of the load and symmetrical along the girder web axis.

3. An overload brake for a trolley, comprising:
   at least one wheel adapted to ride on a support member; and
   a brake member, wherein an overload condition is transmitted to the support member by the at least one wheel, causing angular deformation of the support member to press a portion of the support member into the brake member, thereby braking against translation movement along the support member.

4. The overload brake according to claim 3, wherein said support member comprises a girder with a first surface which said at least one wheel rides on, and said girder further comprises a flange tab which presses against said brake member upon a first amount of angular deformation of the girder.

5. The overload brake according to claim 3, comprising two of said wheel adapted to ride on a support member.

6. The overload brake according to claim 5, wherein said support member comprises a girder with two symmetrical flange tabs of the girder forming a concave C section, wherein said brake member is positioned in an opening of said C section.

7. A method for providing an overload brake for a trolley, comprising:
    providing at least one wheel adapted to ride on a support member; and
    providing a brake member, wherein an overload condition is transmitted to the support member by the at least one wheel, causing angular deformation of the support member to press a portion of the support member into the brake member, thereby braking against translation movement along the support member.

8. The method according to claim 7, wherein said support member comprises a girder with a first surface which said at least one wheel rides on, and said girder further comprises a flange tab which presses against said brake member upon a first amount of angular deformation of the girder.

9. The method according to claim 7, comprising providing two of said wheel adapted to ride on a support member.

10. The method according to claim 9, wherein said support member comprises a girder with two symmetrical flange tabs of the girder forming a concave C section, wherein said brake member is positioned in an opening of said C section.

* * * * *